United States Patent [19]
Baran et al.

[11] Patent Number: 5,210,552
[45] Date of Patent: May 11, 1993

[54] VARIABLE LIGHT TRANSMITTING SUNGLASSES

[75] Inventors: Patrick Baran, Chicago; Sam Cottone, Wooddale; George W. Lamping, Barrington, all of Ill.

[73] Assignee: HLM Sales, Inc., Barrington, Ill.

[21] Appl. No.: 795,005

[22] Filed: Nov. 18, 1991

[51] Int. Cl.⁵ .......................... G02C 7/10; G02C 7/12
[52] U.S. Cl. ......................................... 351/49; 351/44
[58] Field of Search ..................... 351/44, 45, 49, 57, 351/58

[56] References Cited

U.S. PATENT DOCUMENTS

| | | |
|---|---|---|
| 2,005,426 | 11/1933 | Land . |
| 2,298,058 | 6/1940 | Land . |
| 2,304,504 | 5/1940 | Metzger et al. . |
| 2,380,481 | 2/1941 | Tillyer et al. . |
| 2,422,287 | 5/1942 | Bernhelm et al. . |
| 2,565,362 | 12/1948 | Eloranta . |
| 2,688,900 | 2/1951 | Silverman . |
| 3,371,979 | 4/1963 | Catanzaro et al. . |
| 3,423,149 | 1/1965 | Braunhut . |
| 3,944,346 | 11/1974 | Shindler . |
| 4,119,369 | 8/1975 | Eloranta et al. . |
| 4,595,262 | 8/1986 | Ogle . |

FOREIGN PATENT DOCUMENTS 1049920  8/1953  France ................................. 351/49

Primary Examiner—Rodney B. Bovernick
Attorney, Agent, or Firm—Hill, Steadman & Simpson

[57] ABSTRACT

A pair of variable density sunglasses include two lens elements of polarized material forming each lens. The other lens element is rotatable in a channel in the frame by manipulation of a gear mounted on the nose bridge, the gear teeth being engaged with gear teeth on the edge of the outer lens element. Rotation of the gear is limited by a peg extending from the back thereof into an arcuate channel on the nose bridge. The stationary inner lens is prevented from rotation by an edge tab extending into an opening in the lens channel through which the gear and rotatable lens engage.

3 Claims, 2 Drawing Sheets

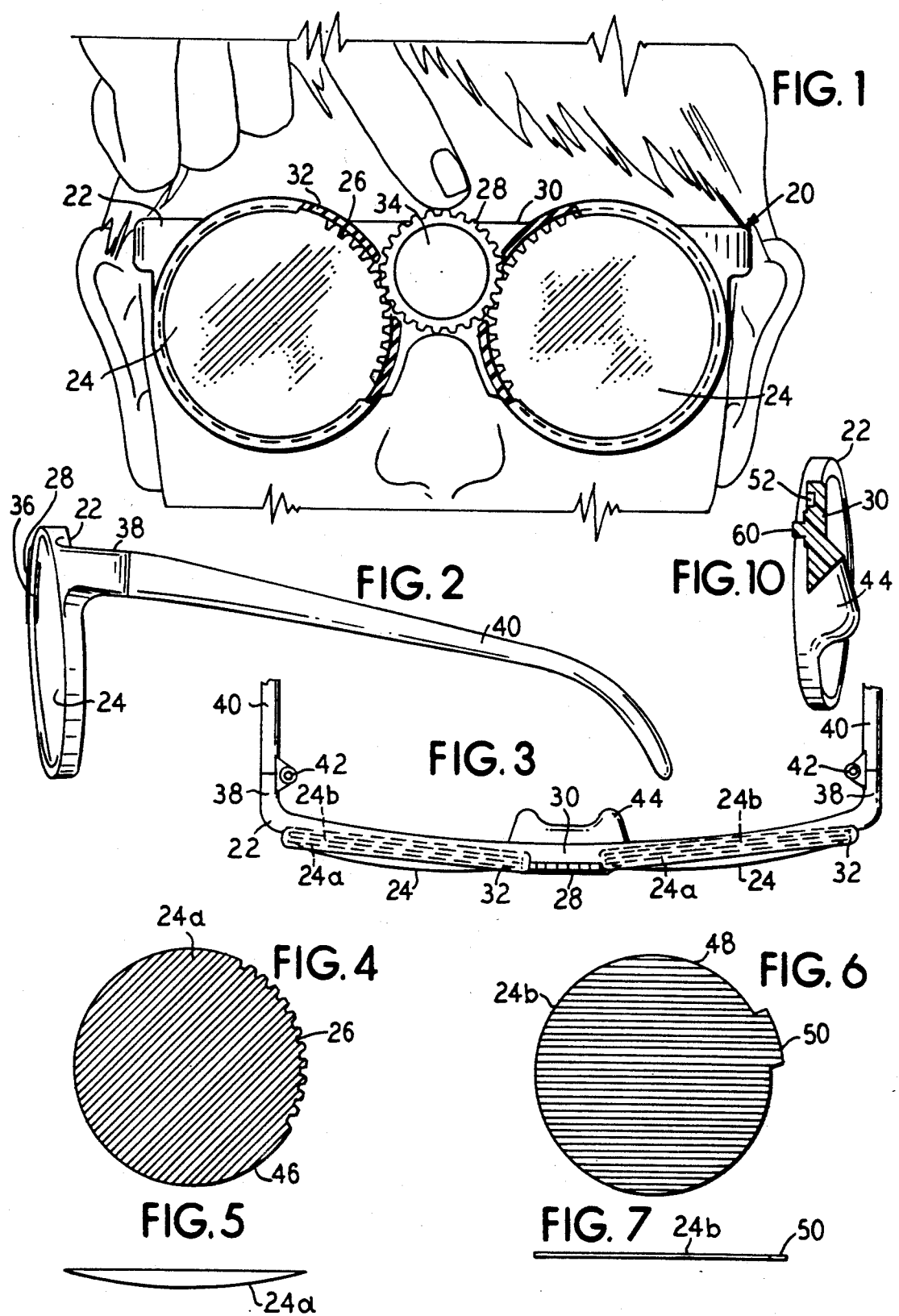

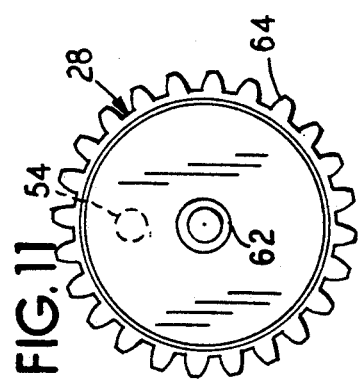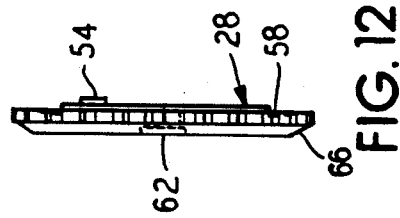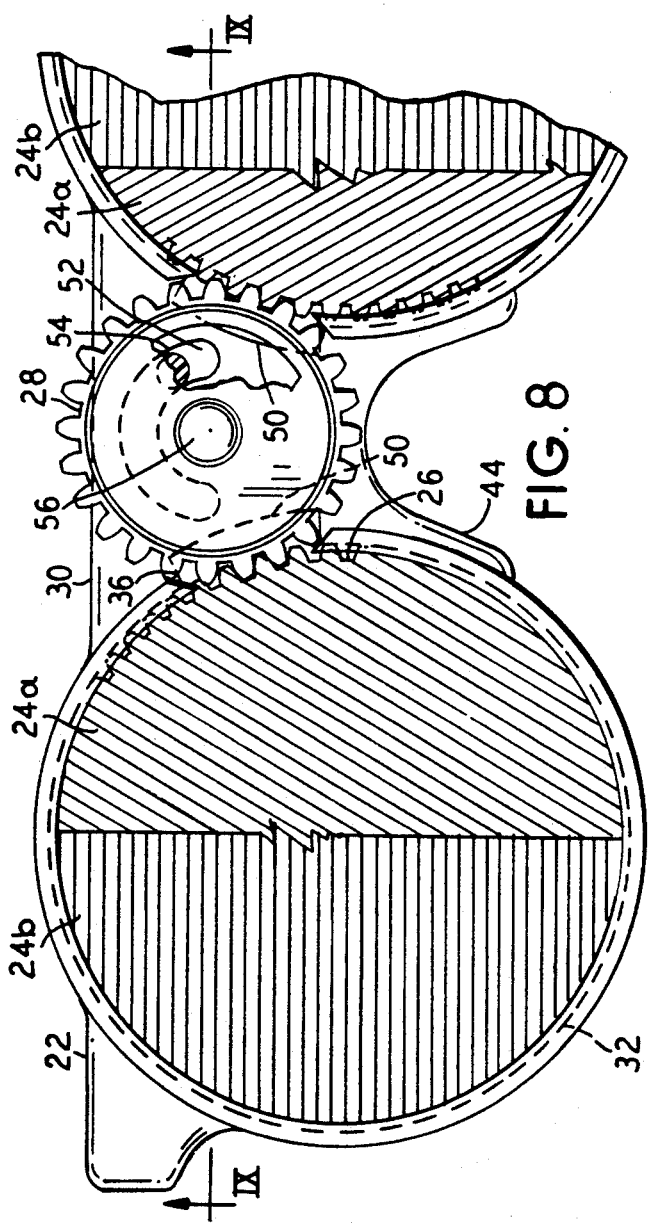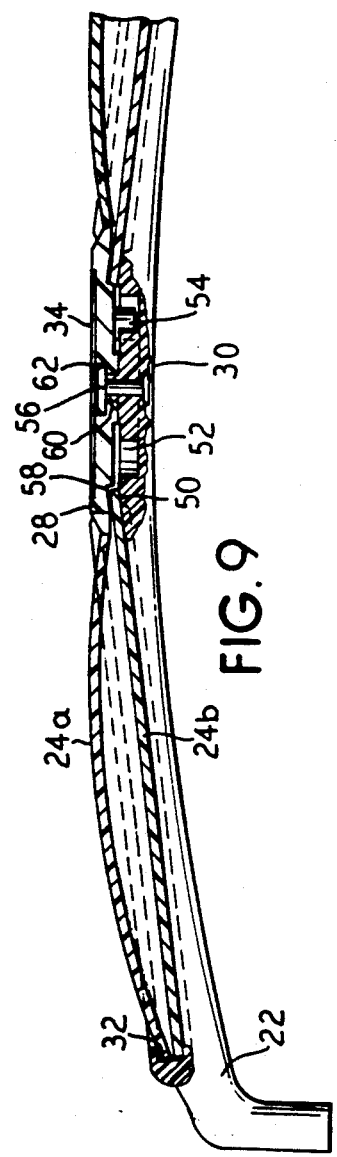

VARIABLE LIGHT TRANSMITTING SUNGLASSES

BACKGROUND OF THE INVENTION

1. Field of the Invention

The present invention relates generally to sunglasses having relatively rotatable polarized lenses over one another for rotation for varying the amount of light transmitted through the lenses.

2. Description of the Related Art

U.S. Pat. No. 2,005,426 discloses a pair of sunglasses having two superimposed polarized lenses for each eye mounted in a pair of ordinary spectacle frames. One of the two lenses is permanently mounted in the frame while the other is rotatably held by lugs in a position adjacent the first lens. The lugs hold the rotatable lenses fictionally against free movement but not so tightly that the user cannot easily rotate the lenses if desired.

U.S. Pat. No. 2,565,362 discloses a variable density goggle in which the lens mounting assembly includes a pair of light polarizing lenses that are fixed relative to the mounting assembly. Between the lenses are mounted a pair of circularly shaped light polarizing elements each having notched or toothed edges over one quarter of its periphery for engagement with a centrally positioned lens control gear which is similarly notched or toothed. The gear element is affixed to a forwardly extending shaft, onto which is applied a knurled turning knob which enables the rotatable lenses to be rotated.

Additional glasses and optical apparatus including polarizing lens elements are disclosed, for example, in U.S. Pat. No. 2,380,481, showing a worm gear across the top of the frame; U.S. Pat. No. 4,595,262 in which groups of polarized lens elements are synchronized in rotation through a centrally mounted gear; and U.S. Pat. No. 2,422,287 disclosing a centrally located turning knob which operates a control arm fixed to a link between rotatable lenses.

SUMMARY OF THE INVENTION

It is an object of the present invention to provide easily adjustable variable density sunglasses which may be adjusted by one finger.

It is another object of the invention to provide adjustable density sunglasses which are fun and fashionable while having an easily accessible density adjustment.

A further object is to provide a pair of easily assembled variable density sunglasses.

Yet another object is to limit the rotation of the rotatable lenses in variable density sunglasses. These and other objects and advantages of the invention are achieved in sunglasses which include a frame having a pair of ear pieces mounted on temple portions at opposite sides of a frame body, the frame body including a pair of lens frames linked by a nose bridge. A stationarily mounted lens of polarized material is affixed in each of the lens frames. The lens frames each include circular channels within which is mounted a rotatable lens also of polarized material so that one stationary lens and one rotatable lens is mounted in registration in each of the lens frames. The rotatable lenses have gear teeth formed in at least a portion of the periphery thereof, and a gear having its teeth enmeshed with the gear teeth on each of the rotatable lenses is mounted for rotation on the nose bridge of the frame. The edge of the gear extends beyond the edge of he nose bridge and is therefore accesible by a wearer's finger so that movement of the gear by a single finger rotates the rotatable polarized lenses relative to the stationary polarized lenses to vary the density for the sunglasses lens assemblies.

It is preferred that the teeth on the gear be rounded with smoothed edges to avoid discomfort when engaging the teeth with the finger for turning the lenses. In one embodiment, means for limiting the angular rotation of the gear are provided. The preferred form of the limiting means is a pin extending between the gear and the frame into a slot of limited angular extent. It is thereby possible to limit the extent to which the lenses may be darkened or lightened.

BRIEF DESCRIPTION OF THE DRAWINGS

FIG. 1 is a partial front facial view of an individual wearing a pair of sunglasses according to the principles of the present invention, the density of the lenses being adjusted by the individual's finger;

FIG. 2 is a side elevational view of the sunglasses of FIG. 1;

FIG. 3 is a partial top plan view of the sunglasses of FIGS. 1 and 2;

FIG. 4 is a plan view of one rotatable lens from the sunglasses according to the present invention;

FIG. 5 is a side view of the lens of FIG. 4;

FIG. 6 is a plan view of one fixed lens of the present sunglasses;

FIG. 7 is a side view of the lens of FIG. 6;

FIG. 8 is an enlarged fragmentary view, partially in cross section, of the present sunglasses showing the rotation limiting means;

FIG. 9 is a horizontal cross section along line IX—IX of FIG. 8;

FIG. 10 is a vertical cross section through the nose bridge of the frame of the present sunglasses;

FIG. 11 is a front view of the gear of the present sunglasses; and

FIG. 12 is a side view of the gear of FIG. 11.

DETAILED DESCRIPTION OF THE PREFERRED EMBODIMENTS

In FIG. 1 is shown a partial face-on view of a person wearing a pair of variable light transmitting sunglasses 20 according to the present invention. The sunglasses include a frame 22 which supports a pair of lenses 24 on the ears and the bridge of the nose so that the lenses 24 are held before the individual's eyes. The lenses 24 are circular and include edge portions 26 formed with gear teeth, the gear teeth of each lens 24 engages with a single, centrally disposed gear 28 that is mounted for rotation on a bridge 30 of the frame 22. The gear 28 has circumferentially disposed teeth at the edges thereof and is mounted so that the teeth at the uppermost part of the gear 28 extend above the edge of the frame 22 at the bridge 30. This permits the wearer to contact the topmost teeth with the wearer's finger as shown in FIG. 1. The wearer is thereby able to rotate the centrally disposed gear 28.

The lenses 24 are slideably mounted in channels 32 in the frame 22. Each of the channels 32 encircles the respective lenses 24 except for an opening 36 in the channel 32 through which the toothed edge portion 26 of each lens 24 is accessible to the gear 28. The rotation of the gear 28, thus, rotates the lenses 24 via the interengagement of the respective gear teeth.

The gear 28 is mounted high enough on the frame 22 so that the gear teeth on the lower edge thereof does not contact the nose of the wearer. In the preferred embodiment, the gear 28 includes a centrally disposed disc 34 upon which logos or other indicia may be marked.

Referring now to FIG. 2, the frame 22 which holds the lenses 24 includes a temple connection 38 to which an earpiece 40 is connected. From this side view may be seen the gear 28 projecting slightly forward of the frame 22 and, at the edge of the gear 28, the channel opening 36.

In FIG. 3, the frame 22 includes a temple junction 38 at each side thereof which connects to respective earpieces 40 by hinges 42. Below the bridge 30 is the nose piece 44 which rests upon the nose of the wearer. The gear 28 is on the bridge 30.

The lenses 24, as shown in phantom, each comprise a pair of lens elements 24a and 24b, which lie in the respective channels 32.

One of the lens elements 24a is shown in FIG. 4. The lens elements 24a is of a polarized, substantially transparent material such as polarized plastic sheet which may be tinted various shades or may be clear. The overall shape of the lens element 24a is circular and the gear teeth are formed along the edge portion 26. To insure that the lens element 24a rotates smoothly within the channel 32, the teeth at the edge portion 26 do not extend beyond the circular overall shape of the lens element. The toothed edge portion 26 extends only partially around the circumference of the circular lens element 24a and, in the illustrated embodiment, extends over approximately 90° of the circumference. This leaves a remaining edge portion 46 which is smooth for ease of sliding movement within the channel 32. The toothed edged portion 26 includes rounded teeth which generally match the shape of the teeth on the gear 28, as will be described hereinafter.

In FIG. 5, the lens element 24 is shown in edge view with a convex front surface. Ordinarily it is desirable that the sunglasses 20 do not effect the vision of the wearer, other than by reduction of the light reaching the eyes, and so the optical characteristics of the lens element 24a is such that no change is made in the wearer's vision. In particular, the lens element 24a is of a constant thickness, planar material and is convex on the outside and concave on the inside surfaces thereof.

FIG. 6 shows the second lens element 24b which is likewise of a polarized material such as a clear or tinted plastic polarized sheet. The lens element 24b includes a circular outer edge 48 and a tab 50 extending beyond the outer edge 48. The tab 50 extends over approximately 10° of the circumference of the circular lens element 24b. Various shaped tabs 50 are contemplated.

In FIG. 7, the second lens element 24b is planar in shape so that no change is made in the wearer's vision. Of course, one or both of the lens elements 24a or 24b may be shaped to form, for example, prescription lenses.

The enlarged front detailed view in FIG. 8 shows the second, or rear, lens element 24b behind the first, or front, lens element 24a in the channel 32. The rear lens element 24b is prevented from rotation by the tab 50 which extends out of the channel 32 through the channel opening 36 and behind the gear 28. The size of the channel opening 36 and the size of the tab 50 are generally matched to one another so that the rear lens element 24b may be inserted through the channel opening 36 yet prevented from rotating in the channel.

The outer lens element 24a is mounted in the channel 32 so that the toothed edge portion 26 is exposed at the channel opening 36. The meshing of the toothed edge portion 26 with the teeth on the gear 28 provides a means for mutually rotating both of the outer lens elements 24a. The gear 28 also lies over the tabs 50 and holds the inner stationary lens elements 24b in the frame 22.

It is desirable to limit the extent of rotational movement of the outer lens elements 24a. This is accomplished by means for limiting the rotation of the gear 28. In the illustrated example, the limiting means includes an arcuate channel 52 formed in the bridge piece 30 of the frame 22, as well as by a peg 54 on the backside of the gear 28 extending into the arcuate channel 52. The arcuate channel 52 is limited in its arcuate extent to thereby limit the rotation of the gear 28 as the peg 54 strikes the ends of the channel 52. In the illustrated embodiment, the channel 52 extends approximately 180°. Although different angular extents are also possible depending on the relative sizes of the gear 28 and the rotatable lens element 24a and the extend of lens rotation desired. The gear 28 rotates about a pivot member 56 disposed at the center thereof.

Referring now to FIG. 9, the flat rear lens elements 24b and the curved front lens elements 24a as shown mounted in the channel 32 of the frame 22. The arrangement of a flat lens element and a curved lens element insures that the lens elements are only in contact at the edges thereof to reduce friction and permit easier sliding movement of the outer lens element 24a on the stationary inner lens element 24b. As may be seen in FIG. 9, the tab 50 extends behind the gear 28 and the rear face of the gear 28 includes a recess 58 to accommodate the tab 50.

The pivot member 56 is shown as a rivet extending through a bore in the bridge 30 of the frame 22. The rivet 56 passes through an axle post 60 extending forwardly of the bridge 30 and the forward head of the rivet 56 rests in a recess 62 in the front surface of the gear 28. The disc 34 on which a logo or other design is displayed mounts over the rivet 56 to cover it from view. The gear 28 is thereby able to rotate freely on the frame 22.

Although a rivet 56 is shown as the pivot member, it is contemplated to instead use a screw, peg or other fastening means, including the possible use of a peg molded in one piece with the gear 28.

The cross section through the bridge 30 as shown in FIG. 10 more clearly shows the relationship between the arcuate slot 52 and the axle post 60. Also shown as the nose piece 44.

FIGS. 11 and 12 show front and side views of the gear 28. In FIG. 11, the recess 62 for accommodating the head of the rivet 56 is shown at the center of the gear while the peg 54 which rides in the arcuate slot 52 is shown in phantom. The gear 28 includes teeth 64 about its entire circumference, the teeth 64 being of a rounded, smooth configuration so as not to be abrasive when contacted by the wearer's finger as shown in FIG. 1.

FIG. 12 also shows the recess 62 at the center of the gear 28 and the peg 54 extending from the rear surface thereof. Also seen is the tab accepting recess 58 adjacent the edges of the gear 28. The front surface of the gear 28 includes a bevel 66.

In operation, the present variable density sunglasses have the two lens elements 24a and 24b making up each lens 24. The lens elements 24a and 24b are of polarized material which, when rotated relative to one another, vary the amount of randomly polarized light passing therethrough. The lens elements 24a are disposed at a common angle relative to one another, and the lens elements 24b are disposed at a common angle relative to one another so that a like amount of light is attenuated by each lens. The wearer may adjust the two polarized lens elements 24a and 24b relative to one another by manipulation of the gear 28 so that the outer lens elements 24a are rotated. The common coupling of the two outer lens elements 24a through the single centrally disposed causes both lenses to rotate simultaneously by an equal extent. Not only may the lenses be rotated when the sunglasses 20 are not worn, but also the positioning of the gear 20 so that the teeth 64 extend above the bridge 30 enable the gear 28 to be rotated and thus the light density of the lenses to be adjusted to the extent desired while the glasses are being worn. In addition to providing easy access for density adjustment, the exposed gear 28 makes a fashion statement and invites interest in the glasses. It is contemplated that the various parts of the sunglasses be formed in plastic of contrasting, bold colors.

Thus, there is shown and described a pair of variable density sunglasses which are easily adjusted, easily assembled, and provided a distinctive look.

Although other modifications and changes may be suggested by those skilled in the art, it is the intention of the inventor to embody within the patent warranted hereon all changes and modifications as reasonably and properly come within the scope of his contribution to the art.

I claim:

1. Variable density sunglasses, comprising:
    a frame including:
        first and second temple pieces for engagement with the ears of a wearer,
        a frame body having said first and second temple pieces mounted on either side thereof, said frame body including first and second lens frame portions joined by a nose bridge, said first and second lens frame portions each having a substantially circular channel;
    a stationary lens fixedly mounted in each of said first and second lens frame portions, said stationary lens being of a polarized optical material;
    a rotatable lens mounted for rotating movement in said substantially circular channel in each of said first and second lens frame portions, said rotatable lenses being of a polarized optical material, said rotatable lenses being in registration with said stationary lenses, said rotatable lenses each having edge portions formed with gear teeth;
    a gear mounted for rotation on said nose bridge of said frame body, said gear having gear teeth around the periphery of said gear, said gear teeth being meshed with said gear teeth on said rotatable lenses, a portion of the periphery of said gear extending beyond said frame body for access by a finger of a wearer to rotate said gear and thereby rotate said rotatable lenses relative to said stationary lenses; and
    wherein said first and second lens frame portions include recesses extending in a direction of said nose bridge, and said stationary lenses each include tabs extending from the edges thereof, said tabs being contained in said recesses.

2. Variable density sunglasses as claimed in claim 1, wherein said recesses are covered by said gear from external view.

3. Variable density sunglasses for wear by a wearer generally over the wearers eyes, comprising:
    a frame having a front side and a back side including:
        first and second lens frames each including a generally circular channel on said front side of said frame and a lens holding recess on said back side of said frame, each of said generally circular channels defining a break in said channel, each of said lens holding recesses including a tab holding recess extending in a radial direction;
    a nose bridge connecting said first and second lens frames to one another, said nose bridge including a nose engaging surface for resting on the nose of the wearer, said tab holding recess in each of said lens holding recesses being directed toward said nose bridge;
    a pin extending from said front side of said nose bridge, said pin having a bore extending axially through said pin, said bore extending through said nose bridge;
    said nose bridge defining an arcuate channel centered on said pin, said arcuate channel extending only partially through said nose bridge;
    hinges mounted on opposite sides of said frame on either side of said first and second lens frames;
    ear pieces connected to said hinges for extending into engagement with the ears of the wearer;
    first and second stationary lenses mounted in said lens holding recesses of respective ones of said first and second lens frames, said first and second stationary lenses each having a tab extending from an edge of said lenses, said tabs being disposed in said tab holding recesses of said lens holding recesses to inhibit rotation of said first and second stationary lenses, said first and second stationary lenses being flat lenses of polarizing material;
    first and second rotatable lenses mounted for sliding rotation in said generally circular channels of respective ones of said first and second lens frames, said first and second rotatable lenses being curved lenses of polarizing material, edge portions of said first and second rotatable lenses being formed with teeth and being mounted so that said toothed edge portions are accessible at said breaks in said generally circular channels;
    a gear mounted for rotation on said pin or said nose bridge, said gear including peripheral teeth engaged with said toothed edge, portions of said first and second rotatable lenses; and
    a peg extending between said gear and said nose bridge into an arcuate channel to limit rotation of said gear on said nose bridge to a predetermined angle.

* * * * *